United States Patent
Seidler et al.

(10) Patent No.: US 9,502,941 B2
(45) Date of Patent: Nov. 22, 2016

(54) ELECTRONICALLY COMMUTATED ELECTRIC MOTOR AND METHOD FOR PRODUCTION THEREOF

(75) Inventors: Siegfried Seidler, Villingen-Schwenningen (DE); Matthias Nickel-Jetter, Villingen-Schwenningen (DE)

(73) Assignee: EBM-PAPST ST. GEORGEN GmbH & Co. KG, St. Georgen (DE)

( * ) Notice: Subject to any disclaimer, the term of this patent is extended or adjusted under 35 U.S.C. 154(b) by 760 days.

(21) Appl. No.: 12/282,646

(22) PCT Filed: Mar. 27, 2006

(86) PCT No.: PCT/EP2006/002785
§ 371 (c)(1),
(2), (4) Date: Sep. 11, 2008

(87) PCT Pub. No.: WO2006/122604
PCT Pub. Date: Nov. 23, 2006

(65) Prior Publication Data
US 2009/0096330 A1    Apr. 16, 2009

(30) Foreign Application Priority Data
May 20, 2005  (DE) .................. 10 2005 024 770

(51) Int. Cl.
*H02K 1/04* (2006.01)
*H02K 11/00* (2006.01)
*H02K 3/52* (2006.01)

(52) U.S. Cl.
CPC .................................... *H02K 3/522* (2013.01)

(58) Field of Classification Search
USPC ........ 310/67 R, 68 D, 42, 43; 29/598, 602.1, 29/605–607
See application file for complete search history.

(56) References Cited

U.S. PATENT DOCUMENTS 4,352,897 A  * 10/1982 Ogata et al. .................. 523/220
4,866,324 A     9/1989 Yuzawa et al. ............... 310/268
(Continued)

FOREIGN PATENT DOCUMENTS

DE         197 47 605 A       6/1998

OTHER PUBLICATIONS

Pat. Abs. of Japan, JP-2003-180 047-A, Fukuno/Asmo Co. Ltd, pub. Jun. 27, 2003, 1 page.
(Continued)

*Primary Examiner* — Quyen Leung
*Assistant Examiner* — Leda Pham
(74) *Attorney, Agent, or Firm* — Milton Oliver, Esq.; Oliver Intellectual Property LLC (57) ABSTRACT

An electronically commutated electric motor has an internal stator (18) and an external rotor (24). They are separated by an air gap (23). A circuit board (68) equipped with openings (58', 70', 72') is arranged on the internal stator (18). The internal stator (18) has a lamination stack (22) that is equipped with a winding arrangement (60; 86, 88) whose terminals are implemented at least in part as wire segments (86E, 88E, 90). The lamination stack (22) of the internal stator (18) is covered, at least locally, by an insulating layer (20) made of a thermally stable plastic. Implemented on said layer are supporting elements (58; 70, 72) that project from the internal stator (18) toward the circuit board (68) and serve to secure wire segments (86E, 88E, 90) of the winding arrangement (86, 88). These supporting elements (58, 70, 72), with the wire segments mounted thereon, are each arranged in an associated opening (58', 70', 72') of the circuit board (68) and are there soldered thereto.

23 Claims, 9 Drawing Sheets

(56) References Cited

U.S. PATENT DOCUMENTS

| | | | |
|---|---|---|---|
| 5,034,643 A | 7/1991 | Trian | 310/215 |
| RE34,001 E * | 7/1992 | Wrobel | 310/71 |
| 5,343,104 A | 8/1994 | Takahashi et al. | 310/90 |
| 5,672,927 A * | 9/1997 | Viskochil | 310/194 |
| 5,747,908 A | 5/1998 | Saneshige et al. | 310/91 |
| 5,973,424 A | 10/1999 | Engelberger et al. | 310/43 |
| 6,072,261 A * | 6/2000 | Lin | 310/424 |
| 2005/0134124 A1* | 6/2005 | Lieu et al. | 310/43 |

OTHER PUBLICATIONS

Pat Abs of Japan, JP 2004-208 446-A, Matsunaga+/Mitsub., publ. Jul. 22, 2004, 1 page.

Ticona US TM REG 2,259,786 of Ticona Engineering (formerly owned by Hoechst AG).

Celanex 1612 Z-79 Thermoplastic Polyester from Ticona Engineering Polymers, datasheet, 2 pp.

Vectra US TM REG 1,383,843 of CNA Holdings, Dallas TX.

\* cited by examiner

ELECTRONICALLY COMMUTATED ELECTRIC MOTOR AND METHOD FOR PRODUCTION THEREOF

CROSS-REFERENCE

This application is a sec. 371 of PCT/EP2006/002785, filed 27 Mar. 2006, claiming priority from DE 10 2005 024 770, filed 20 May 2005.

FIELD OF THE INVENTION

The invention relates to an electronically commutated electric motor, in particular to a subminiature motor, and to a method for the manufacture thereof.

BACKGROUND

Subminiature motors serve, inter alia, to drive mini-fans. The latter serve, for example, to cool processors in computers, for equipment cooling in small equipment, etc., and they have very small dimensions. For example:
  fans of the ebm-papst 250 series have dimensions of 8×25×25 mm;
  those of the ebm-papst 400F series have dimensions of 10×40×40 mm;
  those of the ebm-papst 400 series have dimensions of 20×40×40 mm; and
  fans of the ebm-papst 600 series have dimensions of 25×60×60 mm.

The power consumption of such fans is 0.2-0.6 W for the 250 series, 0.6 to 0.9 W for the 400F series, and 0.4-3.0 W for the 400 and 600 series. Their weight is, for example, approximately 5 (five) g for the 250 series, between 17 g and 27 g for the 400/400F series, and approximately 85 g for the 600 series.

In motors of this miniature size, which must be very inexpensive, it is important to make assembly as simple as possible, so that the highest possible degree of automation becomes possible during manufacture. Only extensive production automation makes possible the uniform quality that is a prerequisite for a long average service life.

A further complicating factor with such subminiature motors is that their components, entirely analogously to those of a mechanical clock mechanism, are very delicate and therefore not very robust. The rotor shaft, for example, is often only as thick as a knitting needle and can therefore easily be bent if handled carelessly, rendering the motor unusable. This danger exists in particular during assembly.

Figure 10:
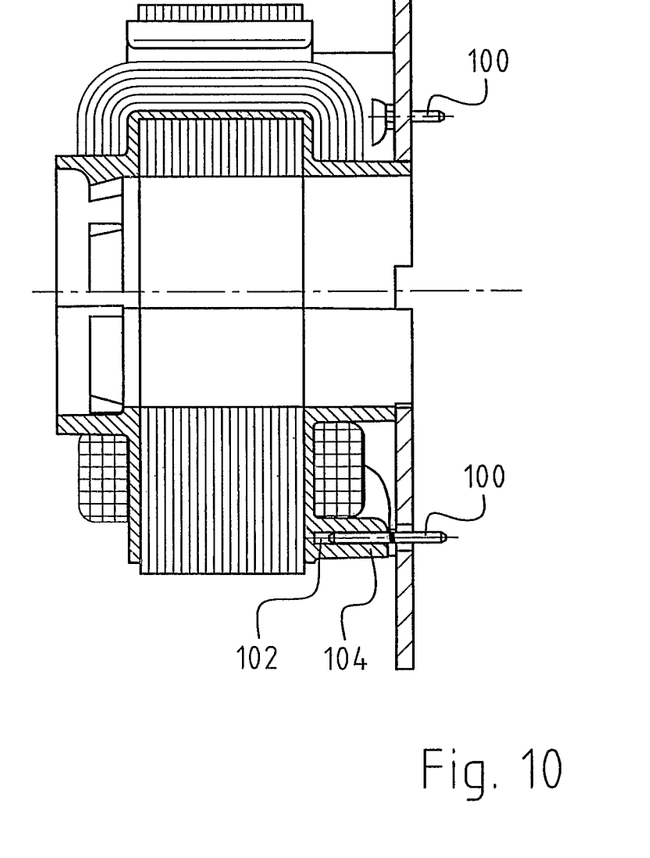
FIG. 10 is a section, analogous to FIG. 4, through the internal stator of a motor according to the prior art.

With such very small motors, automated production is difficult and often requires additional manual work. This applies especially to the connection of elements of the winding arrangement arranged on the stator lamination stack to the associated circuit board. As shown by FIG. 10 below, metal pins that are secured in an insulator which is located on the stator lamination stack have hitherto been used for this. Such pins are pressed, in a separate working step, into holes in the plastic of the injection-embedded lamination stack. They are called "Autosplice" pins.

A metal pin of this kind has one wire end of the winding arrangement of the motor wound around it, and is introduced, through an opening, into the circuit board and then soldered thereto. This method reaches its limits, however, at a maximum wire diameter of approximately 0.24 mm, since with thicker wires a pin of this kind bends, or the orifice in the insulating material of the injection-embedded lamination stack becomes enlarged and destroyed.

In such cases, it is then possible, for example, to solder the enameled copper wire manually onto solder pads of the circuit board. In another method, so-called insulation displacement contacts are used, but, for this, the wire diameter must be greater than approximately 0.17 mm.

SUMMARY OF THE INVENTION

It is therefore an object of the invention to make available a novel electric motor and a novel method for the manufacture thereof.

According to the invention, this object is achieved by a method comprising forming an insulating layer of thermally stable plastic on the lamination stack, forming plastic projections integrally with the plastic layer, wrapping a segment of the winding around the plastic projections, introducing the wire-wrapped projection through a hole in a circuit board and soldering the wire segment to the circuit board. There is no need here for metal pins that must first be pushed into the insulating layer; instead, a securing part manufactured from plastic during the injection-molding operation is used, on which part a wire segment of the winding is secured in suitable fashion, and the combination of plastic securing part and wire segment is then inserted through an associated opening of the circuit board and then soldered to it.

Another manner of achieving the stated object is to arrange a circuit board, formed with openings, on the internal stator, to form plastic projections on an insulating layer covering the lamination stack, to wrap segments of the winding on the plastic projections, to arrange the wrapped projections in the holes in the circuit board and to there solder the wire segments to the circuit board. The fact that the Autosplice pins are omitted from a motor of this kind results in substantially simplified and thus less expensive manufacturing, together with less waste.
A wire segment can be connected to the associated plastic securing part, for example, by being wound onto it. Alternatively, particularly with thicker wires, the wire segment can be at least temporarily mechanically secured in the associated plastic securing part, for example by being pressed into a groove that is provided in said plastic securing part, by adhesive bonding, or in another manner.

BRIEF FIGURE DESCRIPTION

Further details and advantageous refinements of the invention are evident from the exemplifying embodiments, in no way to be understood as a limitation of the invention, that are described below and depicted in the drawings.

FIG. 8 is a greatly enlarged depiction of a plastic securing part that is equipped with a longitudinal groove, and of a wire segment of the winding arrangement secured on said longitudinal groove by being clamped in;

DETAILED DESCRIPTION

Figure 1:
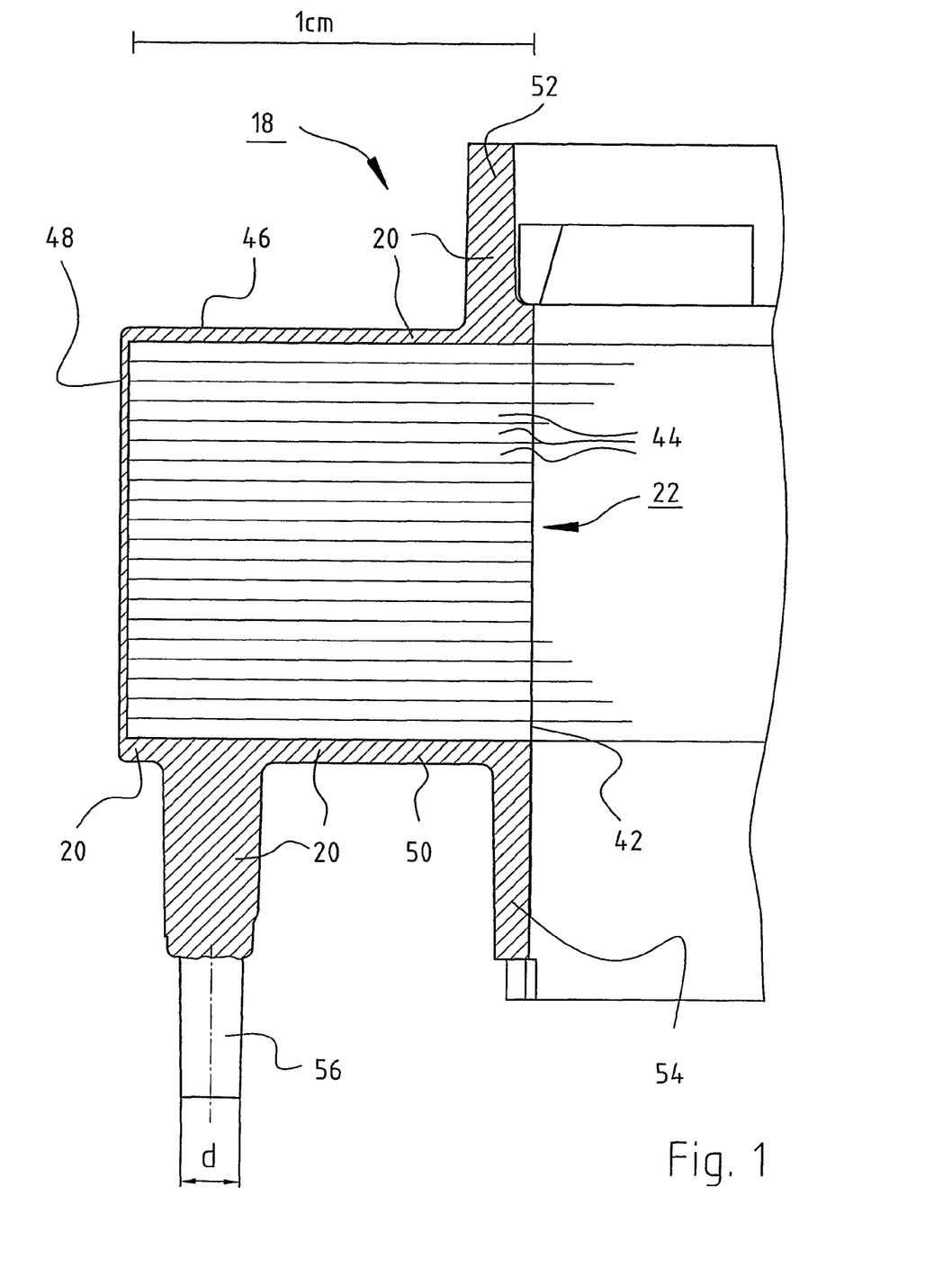
FIG. 1 is a partial sectioned depiction of an internal stator for a motor and a method according to the present invention, before the internal stator is wrapped.
Figure 3:
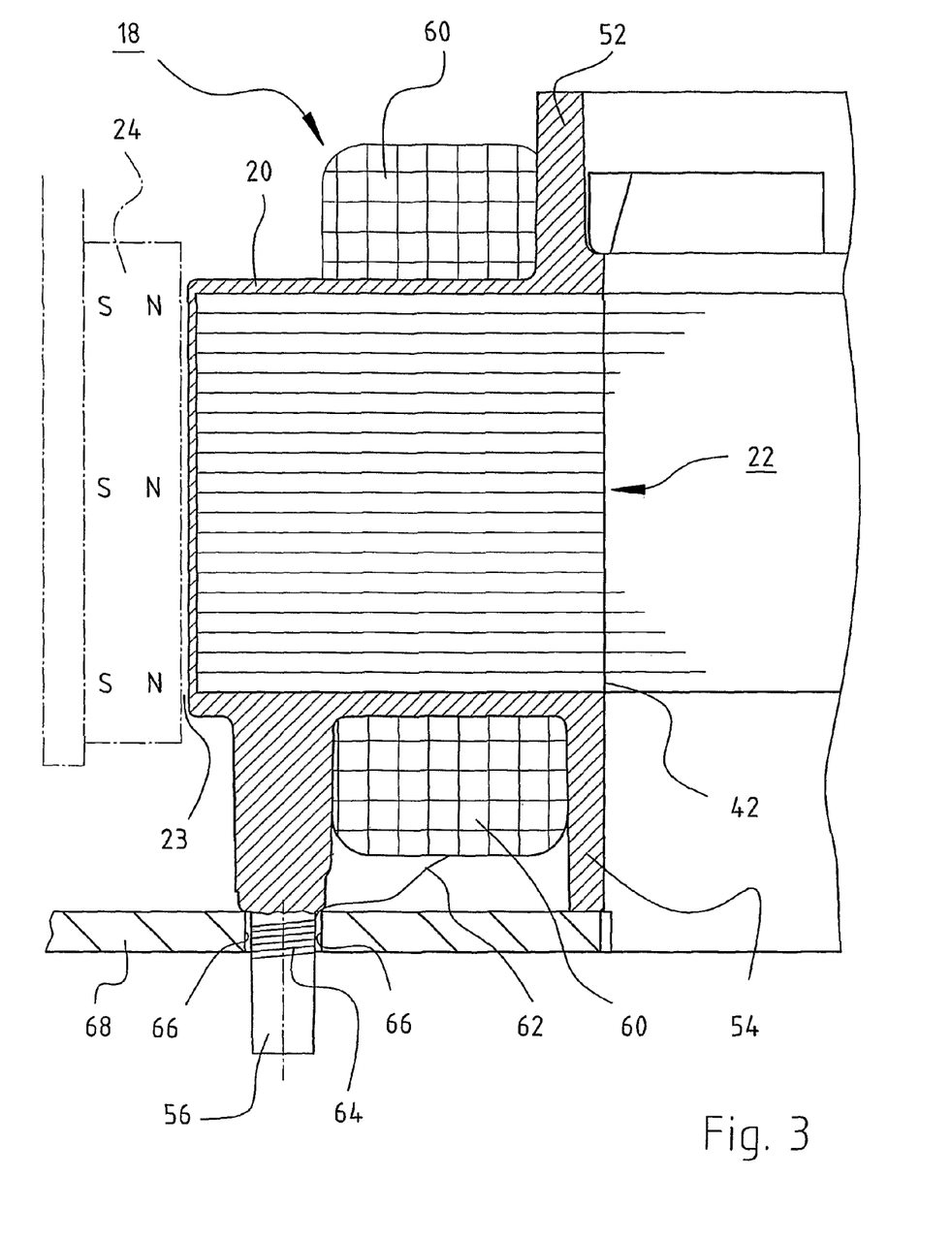
FIG. 3 shows the stator arrangement according to FIG. 1 or 2, in which a plastic securing part is introduced, together with a wire segment wound onto it, into a opening of a circuit board; a portion of an external rotor is indicated with dot-dash lines in FIG. 3.

FIG. 1 shows, at greatly enlarged scale, stator lamination stack 22, injection-embedded into a plastic layer 20, of an internal stator 18 for an external-rotor subminiature motor whose rotor ring magnet 24 is indicated with dot-dash lines in FIG. 3. Said ring magnet is separated from lamination stack 22 by an air gap 23.

To illustrate approximate size, a length of 1 cm is indicated in the usual fashion in FIG. 1, i.e. the stator lamination stack 22 that is depicted can be, for example, approximately one centimeter high. Considerable enlargement is necessary in order to show any details to be depicted.

Figure 5A:
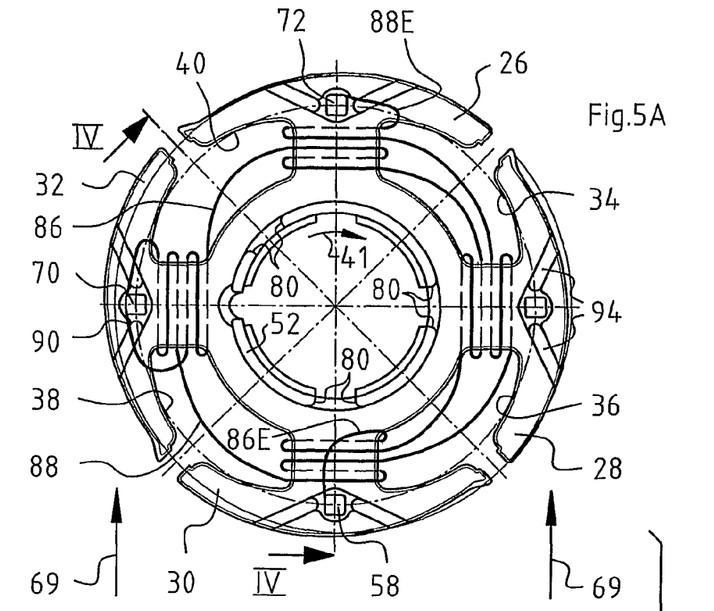
FIG. 5A is a plan view of the stator lamination stack of FIGS. 1 to 4 that is injection-embedded into a plastic layer on which is wound a so-called bifilar winding whose terminals are connected to associated plastic securing parts.

The shape of lamination stack 22 depicted by way of example is evident from FIG. 5A. This shape has four salient poles 26, 28, 30, 32, between which are slots 34, 36, 38, and 40. The poles are implemented on their periphery in such a way that they generate a so-called reluctance torque during operation. In FIG. 5A, rotor 24 (not depicted therein) rotates in a clockwise direction 41.

Because lamination stack 22 has four salient poles, rotor ring magnet 24 is also magnetized in four-pole fashion in the variant depicted. Different numbers of poles can, of course, also be used for stator 22 and rotor 24, for example a version having two stator poles and two rotor poles. Similarly, a winding having only one strand, or a three-strand winding, would also be possible instead of the two-strand winding depicted in FIG. 5A.

Lamination stack 22 has on its inner side an opening 42 that serves for securing on, for example, a bearing tube (not depicted). Lamination stack 22 is constructed in the usual way from individual laminations 44, and it is injection-embedded in plastic layer 20 on its upper side 46, on its outer periphery 48, and on its lower side 50.

Plastic layer 20 transitions on its upper side into a collar 52, on its lower side into a collar 54, and is equipped on its lower side with plastic securing parts 56 that project downward in FIGS. 1 and 3. These have approximately the shape of a pin or post, and in the example depicted have a square cross section with an edge length d of approximately 1.5 mm. Alternatively, other elongated shapes are also possible, for example that of a cylinder having a diameter of approximately 1 mm, which can also be slightly conical.

The plastic used for layer 20, for the two collars 52, 54, and for plastic securing parts 56 is preferably a high-strength and high-temperature-resistant plastic, for example a liquid crystal polymer into which glass fibers are mixed in order to increase strength and reduce anisotropy. One such polymer is offered under the TICONA brand, e.g. VECTRA T 135 grade. A plastic of this kind has a bending moment of approx. 16,000 MPa and a heat deflection temperature under load (HDT (A) per ISO 75-1,2 at 1.8 MPa) of approx. 300° C. This temperature can be briefly exceeded, e.g. up to 370°, without causing this plastic to melt.

This type of plastic is also referred to as LCP. These are thermotropic (i.e. melt-processable) liquid crystal polymers (LCP) with very high temperature resistance. Their molecular structure is characteristic. These polymers are made up of rigid, rod-shaped macromolecules that, in the melt, become parallel and form liquid crystal structures. When this polymer melt is subjected to a shear flow or elongation flow, for example in the context of injection molding, the rigid molecules then arrange themselves into fibers and fibrils, which are "frozen in" upon cooling. This produces the specific morphology of the liquid crystal polymers in their solid state, which is not dissimilar to the morphology of wood. The LCP matrix has fibers of the same polymer embedded in it.

Such polymers are therefore also referred to as "self-reinforcing polymers." In contrast to the known amorphous structure of conventional thermoplastic polymers, the rigid, rod-shaped polymer structure leads to a considerable improvement in mechanical properties and results in some other unusual properties, namely a continuous service temperature of up to 300° C., a melting temperature of up to 370° C., very high tensile strength and a high modulus of elasticity in the flow direction, and high impact toughness.

The more greatly the melt is oriented in one direction, the higher the values obtained for tensile strength, rigidity, and toughness in the flow direction. Thin parts therefore have a particularly pronounced anisotropy. This can be reduced to a certain extent, for example by 50%, by mixing glass fibers into the polymer. The positive material properties are nevertheless largely retained in this context, for example low viscosity in the molten state that enables particularly easy processing.

It is very advantageous that very thin plastic layers (e.g. 0.2 mm) can be generated with such a plastic, since it flows very readily in the molten state and has a low viscosity similar to that of water. This makes possible a very thin slot insulation 20N (see FIGS. 6 and 7), so that once lamination stack 22 has been injection-embedded, more winding room is available in slots 34, 36, 38, 40 than when plastics having a higher melt viscosity are used, so that a larger number of windings can be accommodated therein (greater copper fill factor), thus enabling higher motor performance. A continuous plastic layer with a thickness of, for example, 0.2 mm can likewise be provided on periphery 48 of lamination stack 22, without requiring any increase in the size of air gap 23. This proves to be highly advantageous especially in IP 54-rated motors and for motors that must be protected from salt mist (e.g. for shipboard use).

Figure 2:
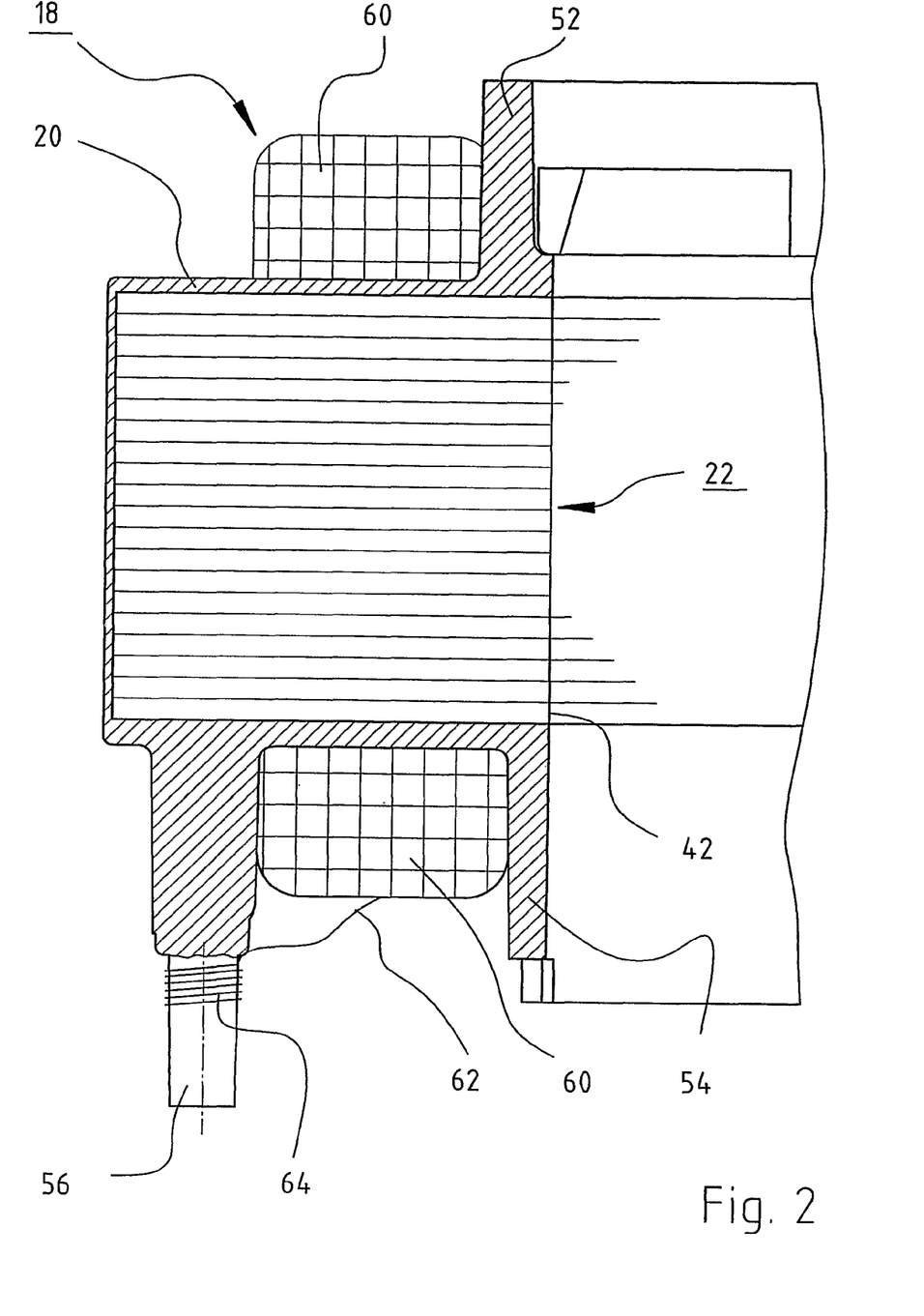
FIG. 2 is a depiction analogous to FIG. 1, after wrapping.

FIG. 2 shows lamination stack 22 of FIG. 1 onto which a winding 60 of enameled copper wire has been wound, plastic parts 20, 52, 54 forming a coil former.

Winding 60 has a terminal wire 62, and the latter is wound around plastic securing part 56 in the form of a small winding 64. This small winding 64 can in many cases be tinned by immersion into a tin bath, which simultaneously burns off the enameling of wire 62.

According to FIG. 3, plastic securing part 56 having winding 64 is then introduced into an opening 66 of a circuit board 68, and circuit board 68 is then soldered in the usual fashion, winding 64 being electrically connected by the solder to one of the conductive tracks (not shown) on circuit board 68.

Figure 4:
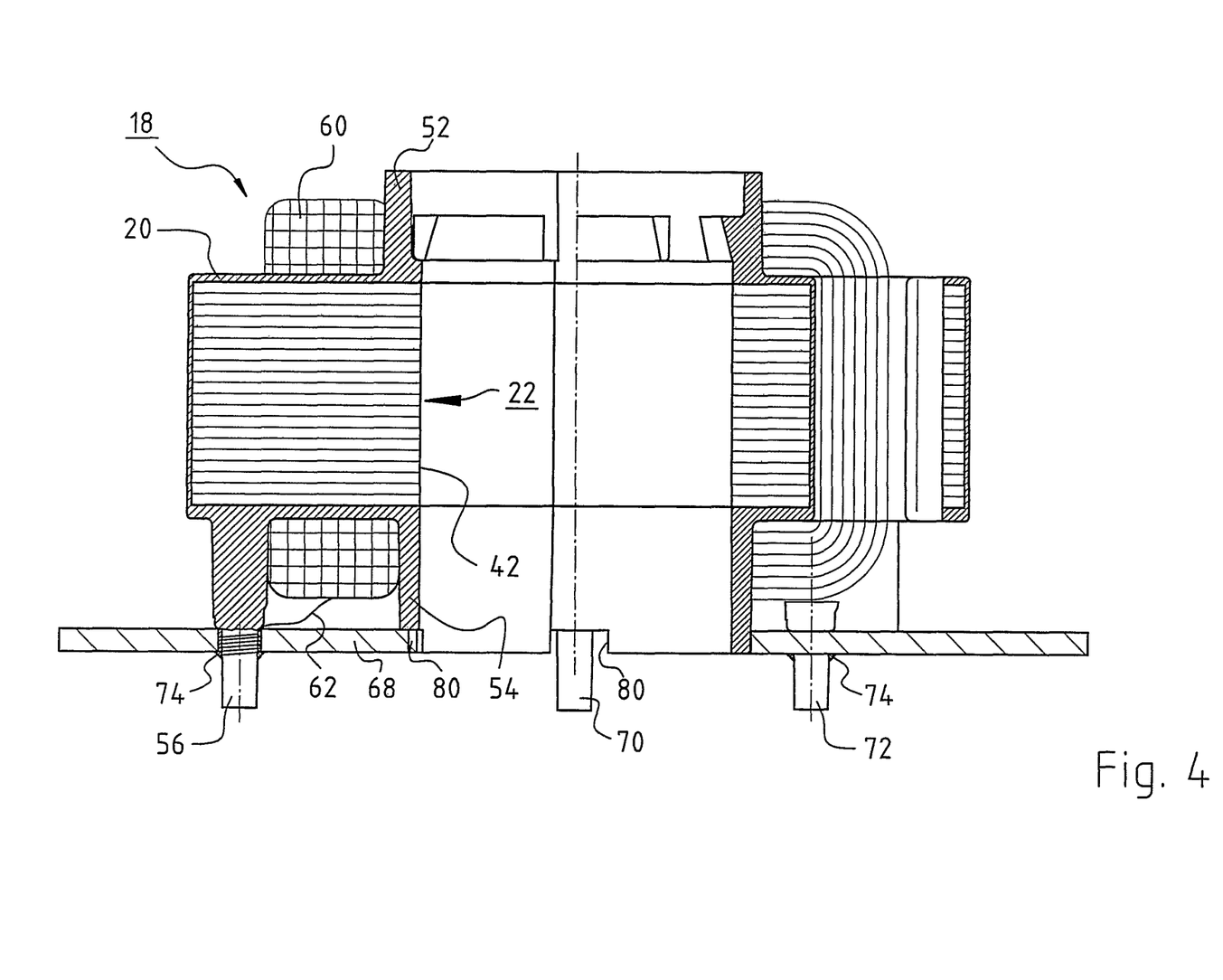
FIG. 4 is a section viewed along line IV-IV of FIG. 5A; in this depiction, a total of three plastic securing parts are visible, which project into associated openings of a circuit board and are soldered there.

FIG. 4 is a section through the completely wrapped stator lamination stack 22 and through circuit board 68, into which latter a total of three plastic securing parts 56, 70, and 72 project. The solder is indicated at 74.

Figure 5B:
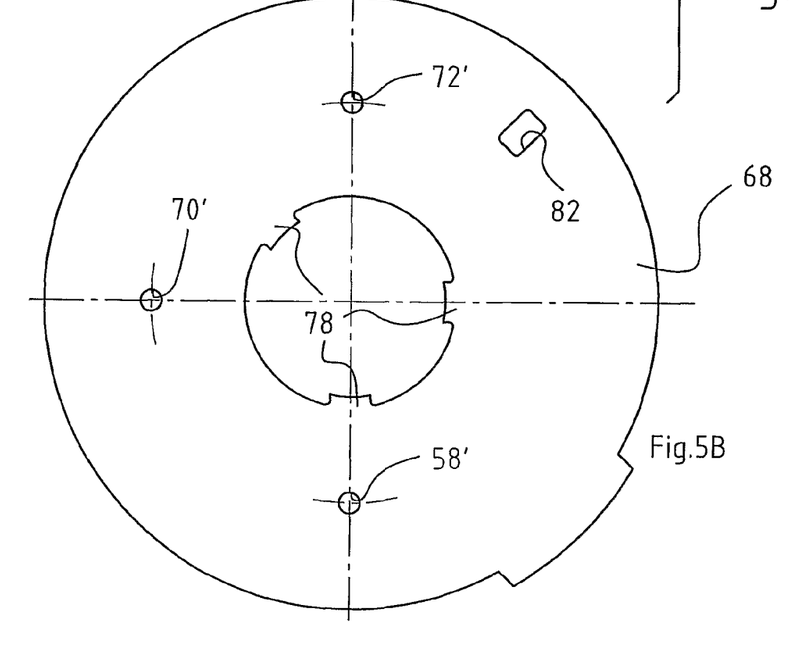
FIG. 5B shows the associated circuit board in the state prior to assembly thereof.

FIG. 5B shows circuit board 68 prior to its installation on the wrapped stator lamination stack 22 (installation is symbolically indicated by arrows 69). Circuit board 68 has three openings 58', 70', and 72' for receiving the three securing parts 58, 70, and 72. It also has, at its center, an opening 76 into which project three protrusions 78 that serve to guide circuit board 68 on corresponding openings 80 of collar 52, and that are asymmetrically distributed in order to preclude assembly errors. Arranged on circuit board 68 is a Hall sensor 82 that is controlled by the leakage field of rotor magnet 24 and serves to control electronic commutation.

FIG. 5A shows the two winding strands 86, 88 of the motor type shown by way of example. These are wound in the usual way in bifilar fashion, i.e. with two parallel wires, and have a common terminal 90 that is mechanically connected to plastic securing part 70. Strand 86 proceeds therefrom clockwise to its end 86E, which is mechanically connected to securing part 58. Strand 88 likewise proceeds from terminal 90, counterclockwise, to its end 88E that is mechanically connected to securing part 72. Strands 86, 88 are then electrically connected to corresponding conductor tracks (not depicted) of circuit board 68 by being soldered to circuit board 68. The currents through strands 86, 88 are controlled in known fashion by Hall sensor 82 as a function of the position of rotor 24. Alternatively, control on the basis of the so-called sensorless principle is possible.

Figure 6:
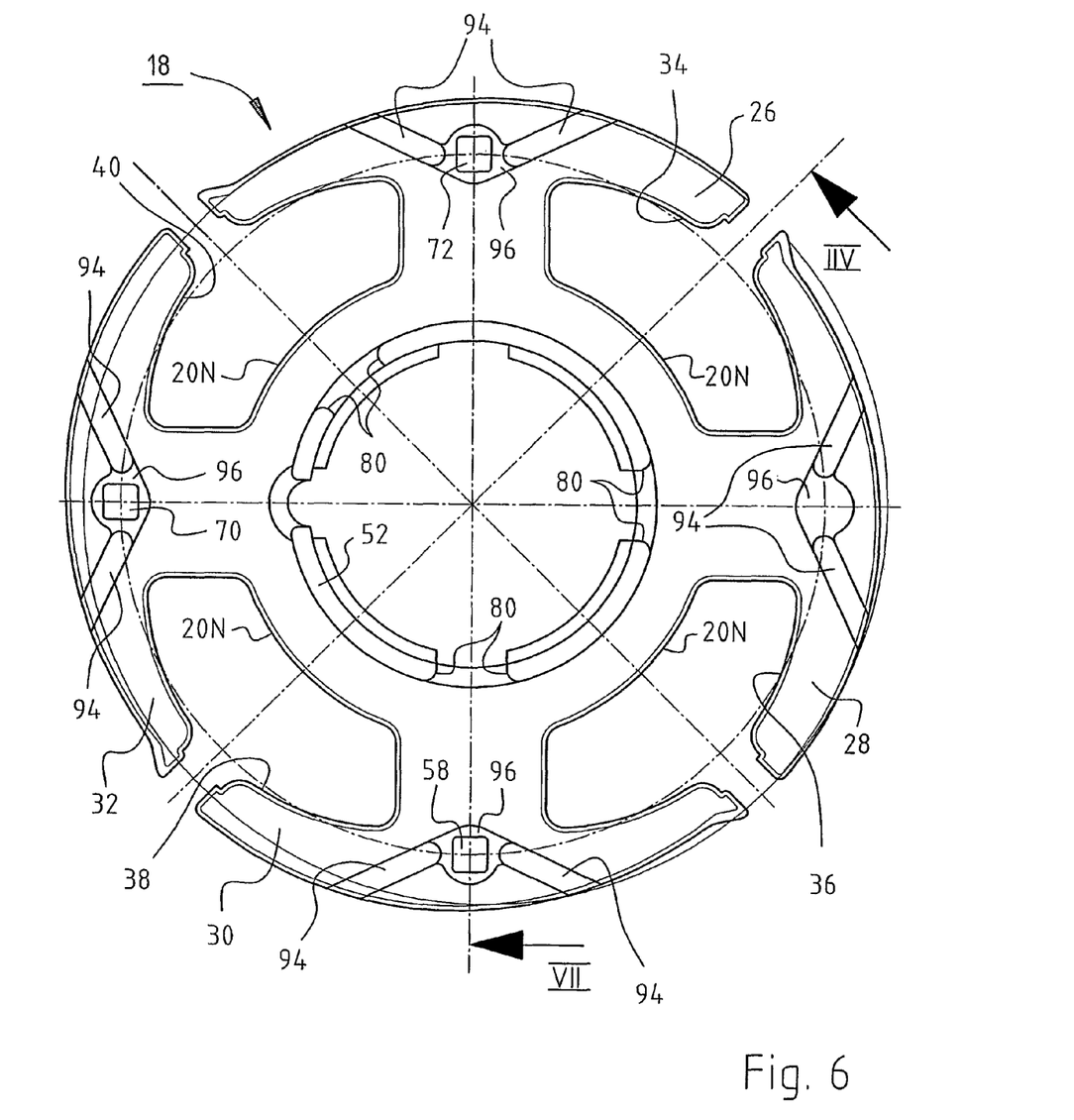
FIG. 6 shows a stator lamination stack analogous to FIG. 5A in its state prior to wrapping.
Figure 7:
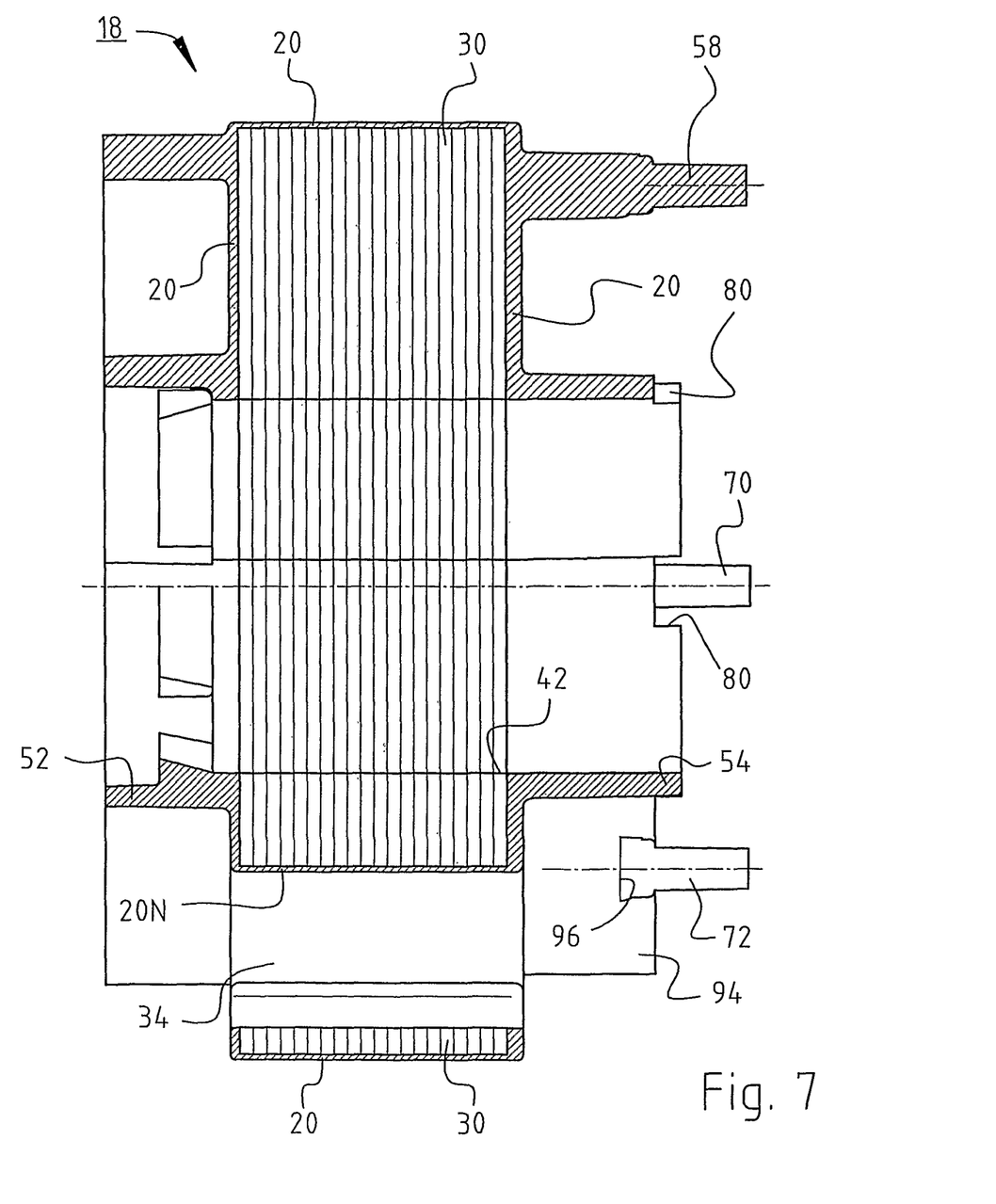
FIG. 7 is a section viewed along line VII-VII of FIG. 6.

Located in the region of each plastic securing part 58, 70, 72 is a respective protective partition 94 (FIGS. 6 and 7) that proceeds in approximately a V-shape and has at its center a depression 96 out of which the relevant plastic securing part 58, 70, 72 projects. Protective partitions 94 have two functions:

a) supporting and spacing members during installation onto circuit board 68;

b) mechanical protection to prevent damage to securing parts 58, 70, 72.

FIG. 6 shows that protective partitions 94 of this kind are also provided therein at the three-o'-clock position, at which (in this example) a securing part is not necessary. These partitions, like securing parts 58, 70, 72, are implemented from the material of insulating layer 20.

Figure 8:
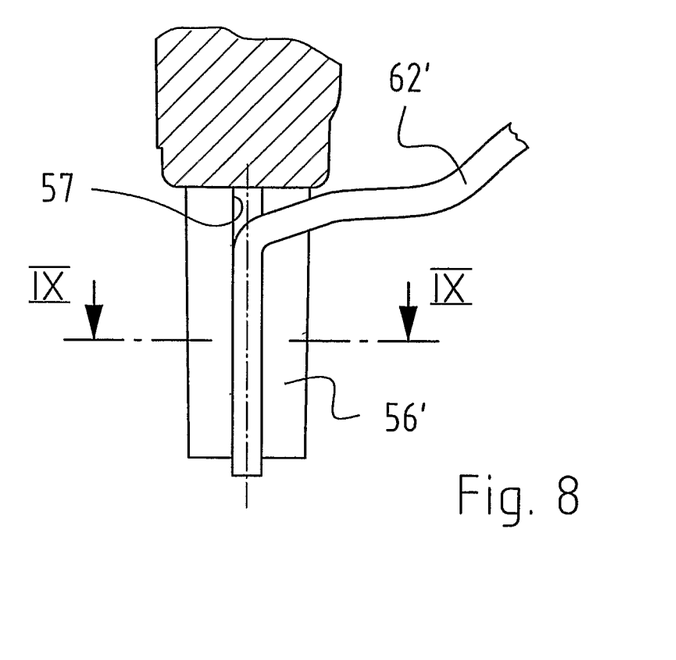
Figure 9:
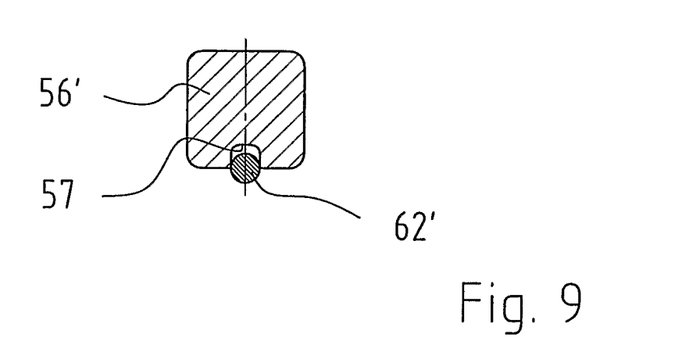
FIG. 9 is a section viewed along line IX-IX of FIG. 8.

FIGS. 8 and 9 show a variant, namely a plastic securing part 56' in which is provided a longitudinal groove 57 in which a connector wire 62' is mechanically secured by being clamped in. This allows the securing of thicker wires, e.g. having a diameter greater than 0.6 mm. These then do not need to be wound around the relevant securing part.

FIG. 10 shows securing of the connector wires onto metal pins 100 according to the prior art. These pins are pressed into orifices 102 of an insulating layer 104, but are suitable only for very thin winding wires up to approx. 0.25 mm diameter, since they can easily be damaged by excessive mechanical stress.

Numerous variants and modifications are of course possible, within the scope of the present invention.

What is claimed is:

1. A method of manufacturing an electronically commutated electric motor, which motor comprises an internal stator (18) and an external rotor (24) that are separated from one another by an air gap (23), which internal stator (18) comprises a lamination stack (22) that is equipped with a winding arrangement (60, 86, 88) whose terminals (62; 62', 86E, 88E, 90) are implemented at least in part from wire, and having a circuit board (68) associated with the winding arrangement, which board is equipped with openings (58', 70', 72'), the method comprising the steps of:

a) forming onto the lamination stack (22) of the internal stator (18), at least locally, an insulating layer (20) composed of a thermally stable plastic;

b) forming, on said insulating layer, plastic securing parts (56, 70, 82) that project from the internal stator (18) toward the circuit board (68), said lamination stack (22) being at least partially injection-embedded into said insulating layer (20), then winding wire onto said lamination stack (22) equipped with the insulating layer (20), to form said winding arrangement (60, 86, 88);

c) winding a wire segment (62; 62', 86E, 88E, 90) of the winding arrangement (60) onto an associated plastic securing part (58);

d) introducing the plastic securing part (58), having the wire segment (62; 62', 86E, 88E, 90) mounted thereon, into an associated opening (58') of the circuit board (68); and e) soldering the wire segment (62; 62', 86E, 88E, 90), introduced together with the plastic securing part (58), to the circuit board (68).

2. The method according to claim 1, further comprising a preliminary step of tinning the wire segment (62; 62', 86E, 88E, 90) before introduction into the opening (58') of the circuit board (68).

3. The method according to claim 1, wherein
the wire segment (62; 62', 86E, 88E, 90) is wound around the associated plastic securing part (58).

4. The method according to claim 1, further comprising equipping the lamination stack (62), in its peripheral region (48)
facing toward the air gap (23), with a continuous insulating layer (20).

5. The method according to claim 1, further comprising forming onto the lamination stack (22), in the region of a plastic securing part (56, 70, 72), at least one partition (94) that is implemented integrally with the insulating layer (20) of the lamination stack (22).

6. The method according to claim 5, further comprising forming onto the lamination stack (22), in the region of a plastic securing part (56, 70, 72), two partitions (94) that proceed from a depression (96), in which depression said plastic securing part (58, 70, 72) is arranged.

7. The method according to claim 5, further comprising forming the at least one partition (94) extending substantially in a region between the lamination stack (22) and the circuit board (68).

8. The method according to claim 1, further comprising making the insulating layer (20) and the at least one plastic securing part (58, 70, 72) by mixing a filler material, selected from the group consisting of glass fibers and mica, into a thermally stable plastic.

9. The method according to claim 1, further comprising using, as said thermally stable plastic, a liquid crystal polymer.

10. The method according to claim 9, further comprising mixing glass fibers into the liquid crystal polymer.

11. The method according to claim 9, further comprising forming the lamination stack (22) with a plurality of slots (34, 36, 38, 40) and applying an insulating layer (20N) made of the liquid crystal polymer onto surfaces defining said slots.

12. An electronically commutated electric motor comprising
an internal stator (18) and an external rotor (24) that are separated from one another by an air gap (23), a circuit board (68) equipped with openings (58', 70', 72') being arranged on the internal stator (18), the internal stator (18) having a lamination stack (22) that is equipped with a winding arrangement (60, 86, 88) whose terminals are implemented at least in part as wire segments (62; 86E, 88E), wherein the lamination stack (22) of the internal stator (18) is covered at least locally by injection-embedding said lamination stack within an insulating layer (20) made of a thermally stable plastic, on which insulating layer are implemented plastic securing parts (58, 70, 72) that project from the internal stator (18) toward the circuit board (68) and serve to secure wire segments (62; 86E, 88E, 90) of the winding arrangement (60, 86, 88), which plastic securing parts, with wire segments mounted thereon, are each arranged in an associated opening (58', 70', 72') of the circuit board (68) and soldered there to the circuit board (68).

13. The motor according to claim 12, wherein
a wire segment (62; 86E, 88E, 90) surrounds each respective associated plastic securing part (58, 70, 72).

14. The motor according to claim 12, wherein
a wire segment (62') extends substantially parallel to the longitudinal direction of an associated plastic securing part (58) and is at least temporarily secured thereto mechanically.

15. The motor according to claim 12, wherein
the lamination stack (22) is equipped, in its peripheral region (48) facing toward the air gap (23), with a continuous layer (20) of the thermally stable plastic.

16. The motor according to claim 15, wherein
the continuous layer (20) has an average layer thickness within a range between 0.2 mm and 0.5 mm.

17. The motor according to claim 12, wherein
the lamination stack (22) comprises, in the region of a plastic securing part (56, 70, 72), at least one partition (94) that is implemented integrally with the insulating layer (20) of the lamination stack (22) and projects therefrom.

18. The motor according to claim 17, wherein
the lamination stack (22) comprises, in the region of a plastic securing part (56, 70, 72), two partitions (94) that proceed from a depression (96) in which at least one securing part (58, 70, 72) is arranged.

19. The motor according to claim 17, wherein
the at least one partition (94) extends substantially in the region between the lamination stack (22) and the circuit board (68).

20. The motor according to claim 12, wherein
the insulating layer (20) and the at least one plastic securing part (58, 70, 72) are made substantially of a thermally stable plastic to which a filler material is added in order to enhance its strength.

21. The motor according to claim 12, wherein
the insulating layer (20) is made, at least predominantly, of a liquid crystal polymer.

22. The motor according to claim 21, wherein
glass fibers are embedded within the liquid crystal polymer.

23. The motor according to claim 12, wherein
the lamination stack (22) comprises slots (34, 36, 38, 40) whose inner side is equipped with an insulating layer (20N) made of the liquid crystal polymer (20).

* * * * *